United States Patent
Song et al.

(10) Patent No.: US 8,514,178 B2
(45) Date of Patent: Aug. 20, 2013

(54) METHOD FOR INPUTTING A STRING OF CHARACTERS AND APPARATUS THEREOF

(75) Inventors: Suyeon Song, Seoul (KR); Sangyeon Lim, Seoul (KR); Jinwoo Park, Seoul (KR); Eunyoung Kim, Seoul (KR); Jieun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 13/033,341

(22) Filed: Feb. 23, 2011

(65) Prior Publication Data

US 2011/0205160 A1  Aug. 25, 2011

(30) Foreign Application Priority Data

Feb. 25, 2010  (KR) .................. 10-2010-0017320

(51) Int. Cl.
*G06F 3/02* (2006.01)
*G06F 3/033* (2013.01)
*G06K 9/18* (2006.01)
*G06K 9/72* (2006.01)

(52) U.S. Cl.
USPC ........... 345/168; 345/173; 382/186; 382/229; 715/773; 715/863

(58) Field of Classification Search
None
See application file for complete search history.

(56) References Cited

U.S. PATENT DOCUMENTS

| | | | |
|---|---|---|---|
| 2002/0149569 A1* | 10/2002 | Dutta et al. | 345/173 |
| 2005/0190973 A1* | 9/2005 | Kristensson et al. | 382/229 |
| 2006/0253793 A1* | 11/2006 | Zhai et al. | 715/773 |
| 2007/0040813 A1* | 2/2007 | Kushler et al. | 345/173 |
| 2008/0270896 A1* | 10/2008 | Kristensson | 715/261 |
| 2010/0238125 A1* | 9/2010 | Ronkainen | 345/173 |
| 2010/0241984 A1* | 9/2010 | Nurmi et al. | 715/773 |

OTHER PUBLICATIONS

ShapeWriter for mobile text and command input from ease to efficiency, ShapeWriter, Inc., copyright 2008, p. 1-17.*

* cited by examiner

*Primary Examiner* — Alexander S Beck
*Assistant Examiner* — Kirk Hermann
(74) *Attorney, Agent, or Firm* — Birch, Stewart, Kolasch & Birch, LLP

(57) ABSTRACT

Provided herein is a method and apparatus for more effectively and accurately inputting a character string through a gesture input, and the apparatus for inputting a character string associated with an embodiment of the present invention may include a keypad for inputting a gesture generated by touch motion; a memory configured to store at least one of a gesture, character string information corresponding to the gesture, and a gesture input from the keypad; a controller configured to identify a character string corresponding to the gesture input from the keypad to extract a character string corresponding to the identified character string or including the identified character string among the character strings previously stored in the memory; and a display unit configured to display the extracted character string under a control of the controller.

15 Claims, 15 Drawing Sheets

TOUCH UP

901

METHOD FOR INPUTTING A STRING OF CHARACTERS AND APPARATUS THEREOF

RELATED APPLICATION

Pursuant to 35 U.S.C. §119(a), this application claims the benefit of earlier filing date and right of priority to Korean Application No. 10-2010-0017320, filed on Feb. 25, 2010, the contents of which is incorporated by reference herein in its entirety.

BACKGROUND OF THE INVENTION

1. Field of the Invention

The present disclosure relates to a method for inputting a string of characters and an apparatus thereof, and more particularly, to a method for inputting a string of characters by a gesture related to a keypad layout and an apparatus thereof.

2. Description of the Related Art

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player.

For the functional support and enhancement of such a mobile terminal, it may be considered to improve the structural and/or software aspects of the mobile terminal.

In case of a mobile terminal, the size thereof is small and thus an apparatus for inputting a character string or the like has a limitation in the size. Accordingly, studies on the methods and apparatuses for inputting a character string corresponding to a user gesture to more effectively and accurately input the character string, such as a text or the like, have been carried out.

SUMMARY OF THE INVENTION

One aspect of the present invention is to provide a method and apparatus for more effectively and accurately inputting a character string in a method for identifying a character string corresponding to a gesture input to provide it as an input.

In order to accomplish the foregoing objective, a method for inputting a character string associated with an example of the present invention may include receiving a gesture generated by touch motion on a keypad; identifying a character string corresponding to the input gesture; extracting a character string corresponding to the identified character string or including the identified character string among the character strings previously stored in a memory; and displaying the extracted character string.

Furthermore, in order to accomplish the foregoing objective, an apparatus for inputting a character string associated with an example of the present invention may include a keypad for inputting a gesture generated by touch motion; a memory configured to store at least one of a gesture, character string information corresponding to the gesture, and a gesture input from the keypad; a controller configured to identify a character string corresponding to the gesture input from the keypad to extract a character string corresponding to the identified character string or including the identified character string among the character strings previously stored in the memory; and a display unit configured to display the extracted character string under a control of the controller.

According to a method and apparatus for inputting a character string having the foregoing configuration associated with at least one embodiment of the present invention, candidate words corresponding to a gesture being inputted during the user's input are displayed, and furthermore, character keys to be subsequently inputted are displayed in a highlighted manner, thereby allowing the user to more speedily and accurately input a character string.

According to a method and apparatus for inputting a character string having the foregoing configuration associated with at least one embodiment of the present invention, a character string or handwriting with a different language corresponding to an input gesture is allowed to be input without an additional language selection or input mode change.

According to a method and apparatus for inputting a character string having the foregoing configuration associated with at least one embodiment of the present invention, an input gesture or characters corresponding to the input gesture is allowed to be easily modified.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile communication terminal associated with the present invention will be described in more detail with reference to the accompanying drawings. A suffix "module" or "unit" used for constituent elements disclosed in the following description is merely intended for easy description of the specification, and the suffix itself does not give any special meaning or function.

A mobile communication terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

Figure 1:
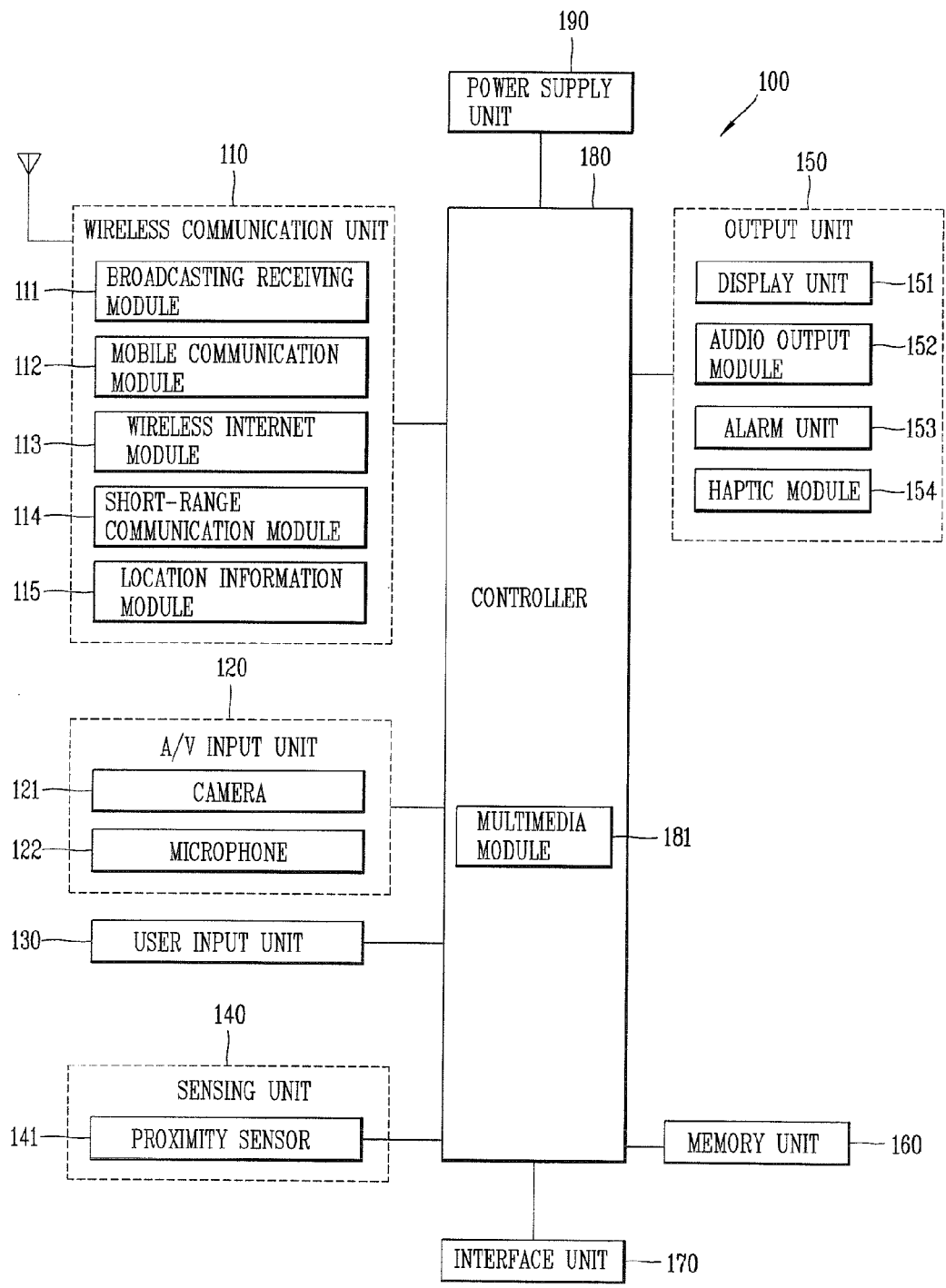
FIG. 1 is a block diagram illustrating a mobile terminal associated with an embodiment of the present invention.

FIG. 1 is a block diagram illustrating a mobile communication terminal associated with an embodiment of the present invention.

The mobile communication terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements will be described in sequence.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile communication terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile communication terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile communication terminal 100 such as an opened or closed state of the mobile communication terminal 100, a location of the mobile communication terminal 100, an orientation of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the portable terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Figure 2A:
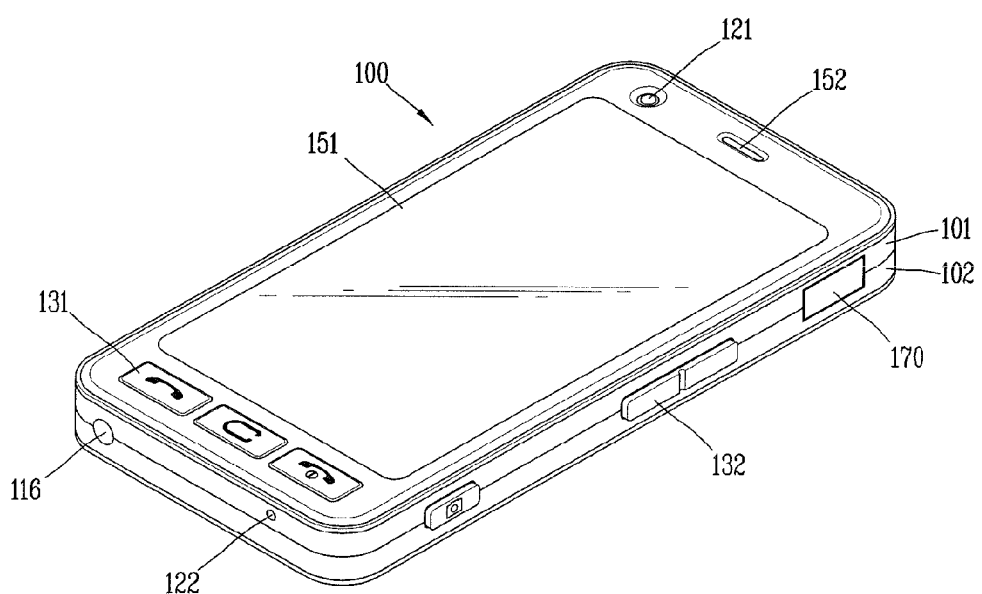
FIG. 2A is a front perspective view illustrating a portable terminal associated with an embodiment of the present invention.

FIG. 2A is a front perspective view illustrating an example of a portable terminal or mobile terminal associated with the present invention.

The portable terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (e.g., 131, 132), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may be used to receive a command, such as start, end, scroll, or the like, and the second manipulation unit 132 may be used to receive a command, such as controlling a volume level being outputted from the audio output unit 152, or switching it into a touch recognition mode of the display unit 151.

Figure 2B:
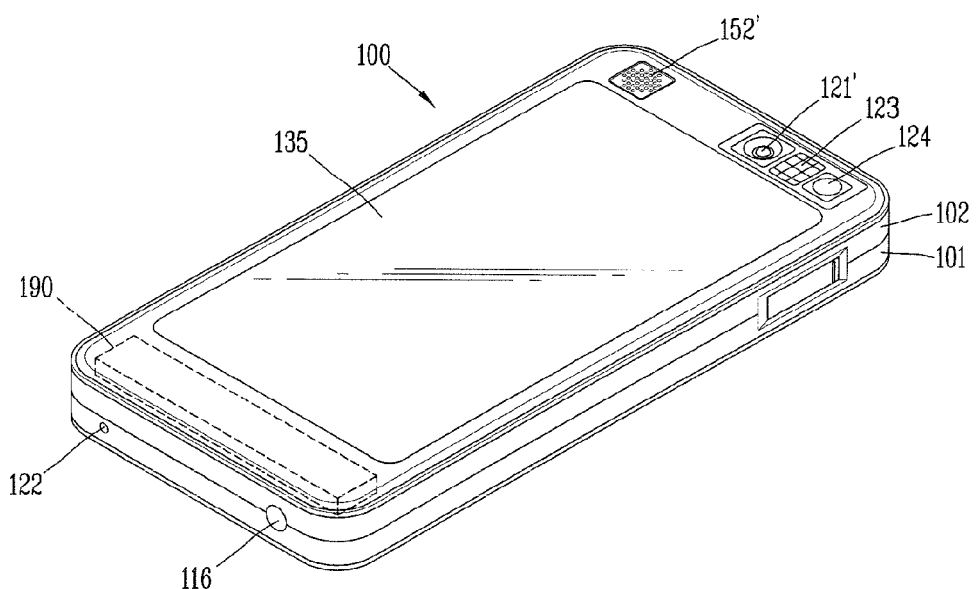
FIG. 2B is a rear perspective view illustrating a portable terminal associated with an embodiment of the present invention.

FIG. 2B is a rear perspective view illustrating a mobile communication terminal illustrated in FIG. 2A.

Referring to FIG. 2B, a camera 121' may be additionally mounted on a rear surface of the terminal body, namely, the rear case 102. The camera 121' has an image capturing direction, which is substantially opposite to the direction of the camera 121 (refer to FIG. 2A), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately. The cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, an antenna for receiving broadcast signals may be additionally disposed on a lateral surface of the terminal body. The antenna 124 constituting a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151. In this case, if the display unit 151 is configured to display visual information on both surfaces thereof, then visual information may be recognized through the touch pad 135. All the information displayed on the both surfaces may be controlled by the touch pad 135. Alternatively, a display is additionally mounted on the touch pad 135, and thus a touch screen may be also disposed on the rear case 102.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

Hereinafter, an operation method of the touch pad 135 in a reciprocal relation to the display unit 151 will be described below with reference to FIGS. 3A and 3B.

Figure 3A:
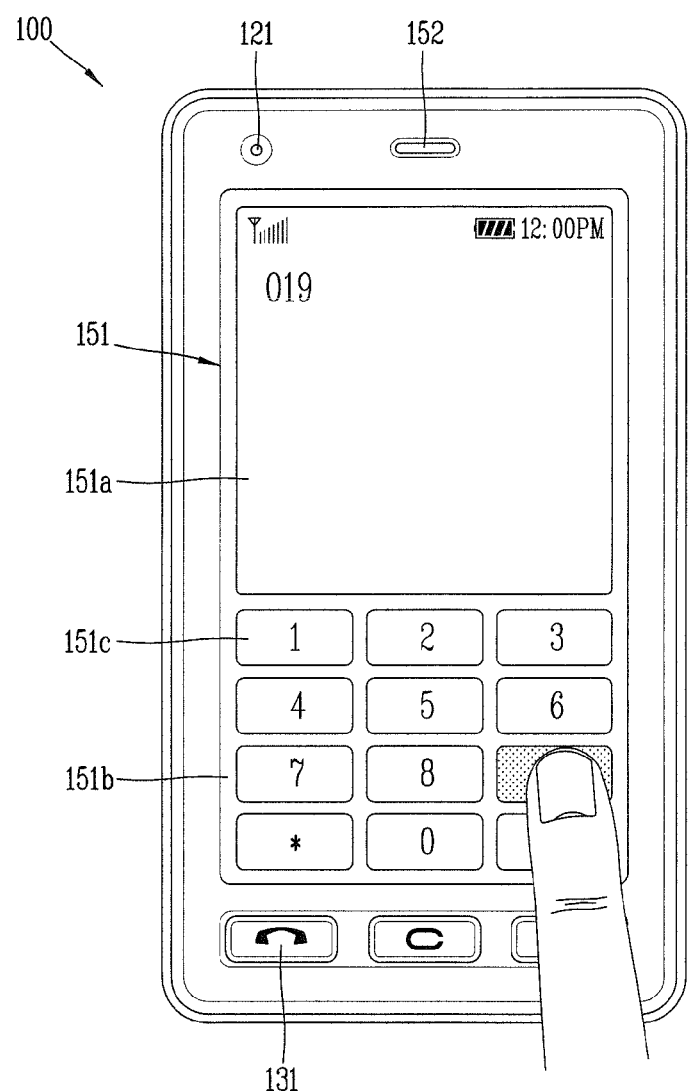
FIGS. 3A and 3B are front views illustrating a portable terminal for explaining the operation state of a portable terminal associated with the present invention.
Figure 3B:
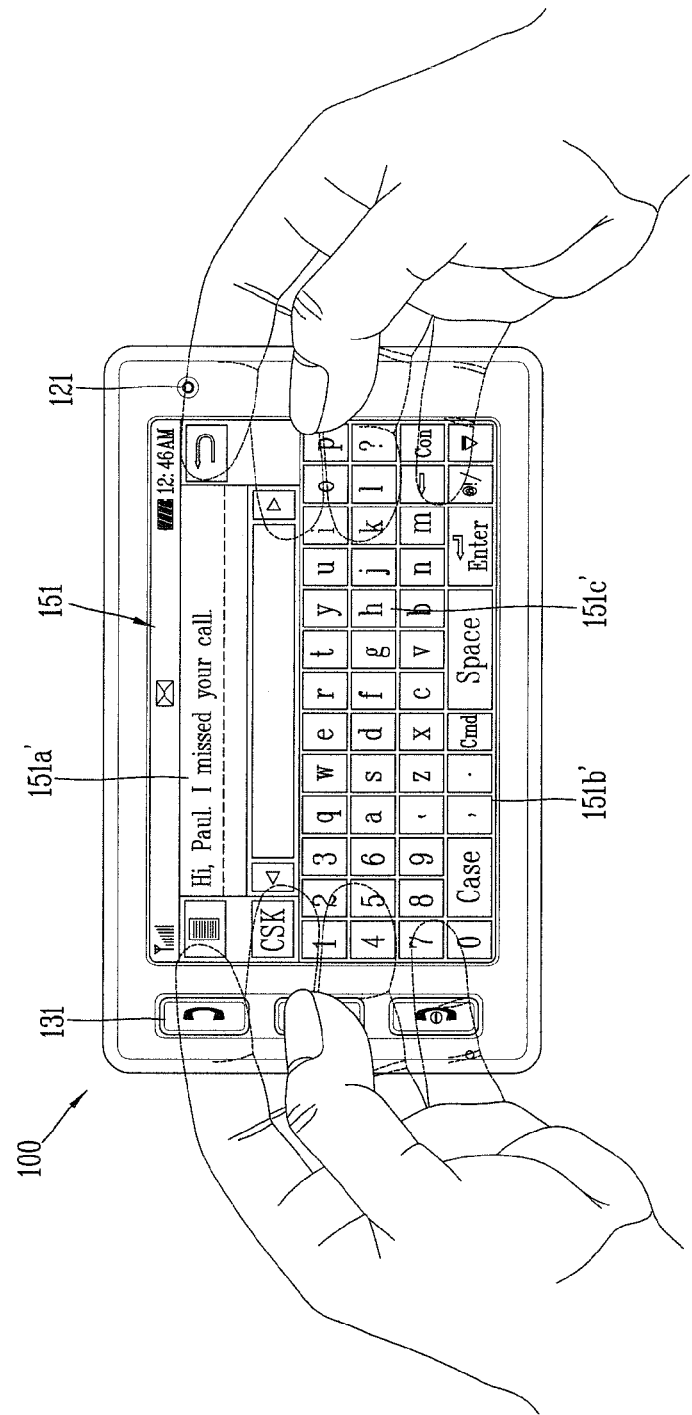

FIGS. 3A and 3B are front views illustrating a portable terminal for explaining an operation state of a portable terminal associated with the present invention.

Various kinds of visual information may be displayed on the display unit 151. The visual information may be displayed in a form of characters, numerals, symbols, graphics, or icons.

For an input of the visual information, at least one of the characters, numerals, symbols, graphics, or icons may be displayed with a predetermined arrangement so as to be implemented in a form of keypad. Such a keypad may be referred to as a so-called "soft key."

FIG. 3A illustrates a view in which a touch applied to a soft key is inputted through a front surface of the terminal body.

The display unit 151 may operate on an entire region or operate by dividing into a plurality of regions. In case of the latter, the plurality of regions may be configured to operate in an associative way.

For example, an output window 151a and an input window 151b may be displayed on the upper portion and lower portion of the display unit 151 respectively. The output window 151a and the input window 151b may be regions allocated to output or input information respectively. A soft key 151c on which numerals for inputting phone numbers or the like are displayed is outputted on the input window 151b. When the soft key 151c is touched, numerals corresponding to the touched soft key are displayed on the output window 151a. When the first manipulating unit 131 is manipulated, a call connection for the phone number displayed on the output window 151a is attempted.

FIG. 3B illustrates a configuration in which a touch applied to the soft key is inputted through a rear surface of the terminal body. If FIG. 3A illustrates a case where the terminal body is vertically arranged (portrait), then FIG. 3B illustrates a case where the terminal body is horizontally arranged (landscape). The display unit 151 may be configured to change a display screen according to an arrangement direction of the terminal body.

FIG. 3B illustrates that a text input mode is operated in a portable terminal. An output window 151a' and an input window 151b' are displayed on the 151. A plurality of soft keys 151c' displayed with at least one of the characters, numerals, symbols, and the like may be arranged in the input window 151b'. The soft keys 151c' may be arranged in the form of a QWERTY key layout. If soft keys 151c' are touched through the touch pad 135 (refer to FIG. 2B), a character, a numeral, a symbol, or the like corresponding to the touched soft key will be displayed in the output window 151a'. In this manner, a touch input through the touch pad 135 has an advantage of preventing soft keys 151c' from being hidden by a finger at the time of touching, compared to a touch input through the display unit 151. In case where the display unit 151 and the touch pad 135 are transparently formed, fingers located at a rear surface of the terminal body can be visually checked, thereby allowing a more accurate touch input.

In addition to an input method disclosed in the foregoing embodiments, the display unit 151 or the touch pad 135 may be configured to be touch-inputted by a scroll. The user may move an object displayed on the display unit 151, for example, a cursor or pointer located on an icon or the like, by scrolling the display unit 151 or the touch pad 135. Moreover, when a finger is moved on the display unit 151 or the touch pad 135, a path being moved by the finger may be visually displayed on the display unit 151. It may be useful to edit an image displayed on the display unit 151.

In order to cope with a case where the display unit 151 (touch screen) and the touch pad 135 are touched together within a predetermined period of time, one function of the terminal may be executed. As a case of being touched together, there is a case when the user clamps a terminal body using the thumb and forefinger. For one of the above functions, for example, there may be an activation or de-activation for the display unit 151 or the touch pad 135.

Hereinafter, embodiments associated with a control method that can be implemented in a terminal having the foregoing configuration will be described with reference to the accompanying drawings. Embodiments which will be described later may be used individually or in combination with each other. Furthermore, the embodiments which will be described later may be used in combination with a user interface (UI) as described above.

Figure 4A:
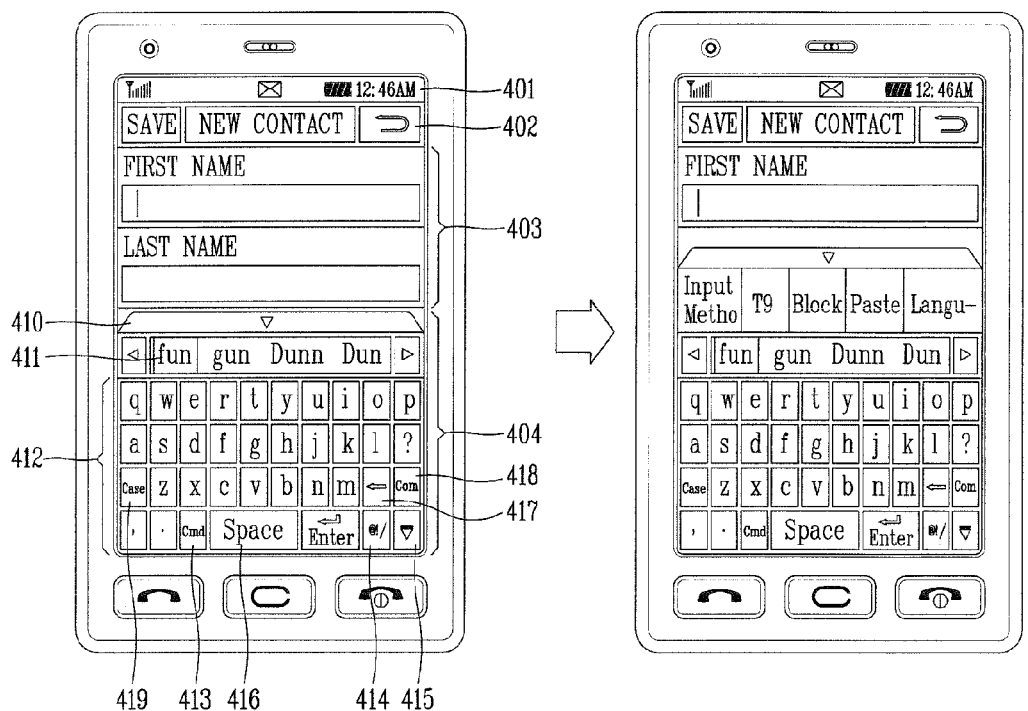
FIGS. 4A and 4B are views illustrating a shape writer associated with an embodiment of the present invention.
Figure 4B:
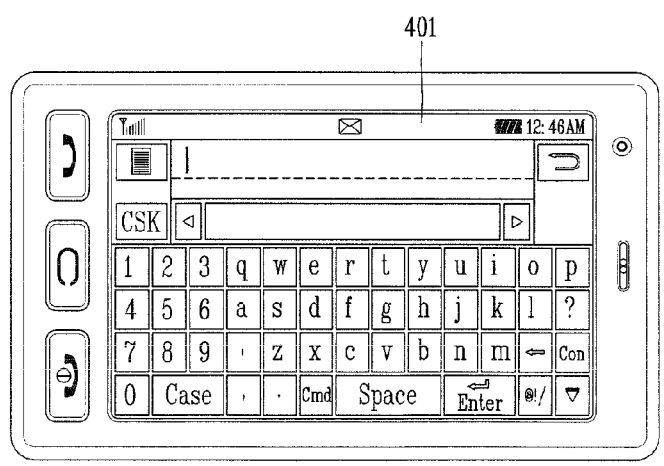
Figure 5A:
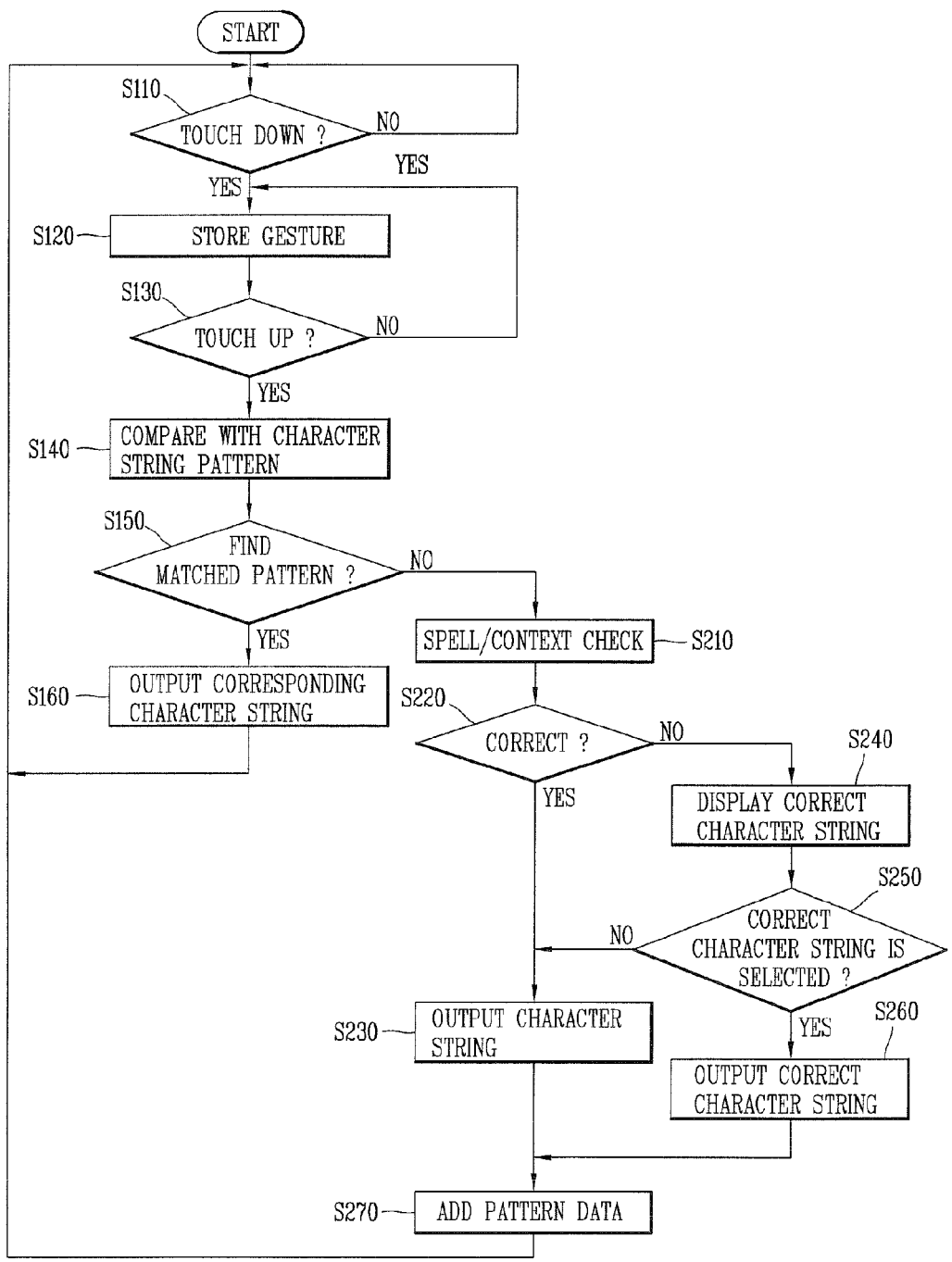
FIGS. 5A and 5B are flow charts illustrating the process of outputting a character string associated with a gesture input from the user according to an embodiment of the present invention.
Figure 5B:
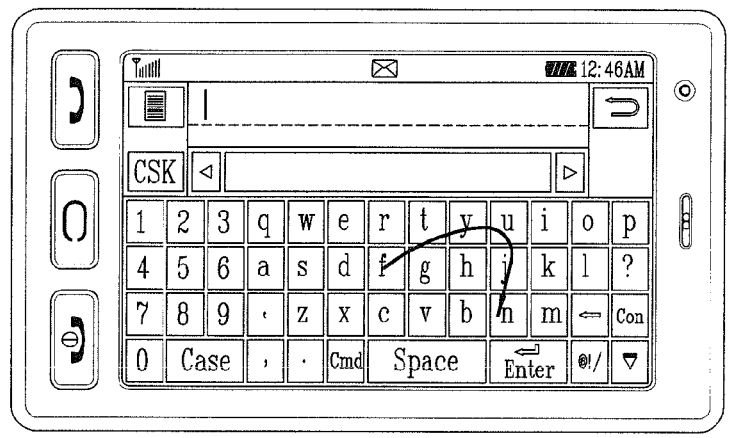
Figure 5B:
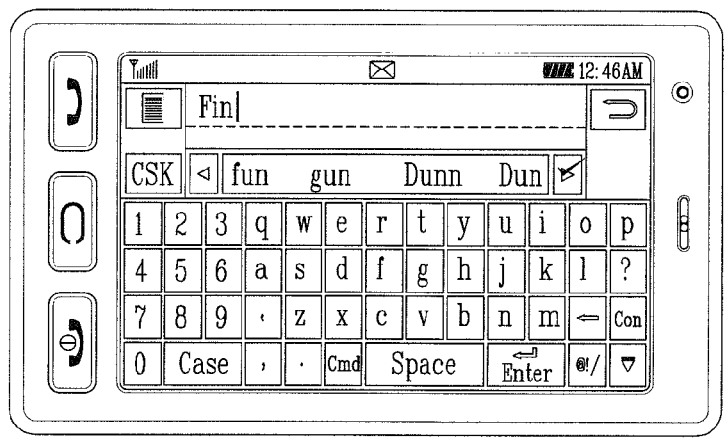
Figure 5B:
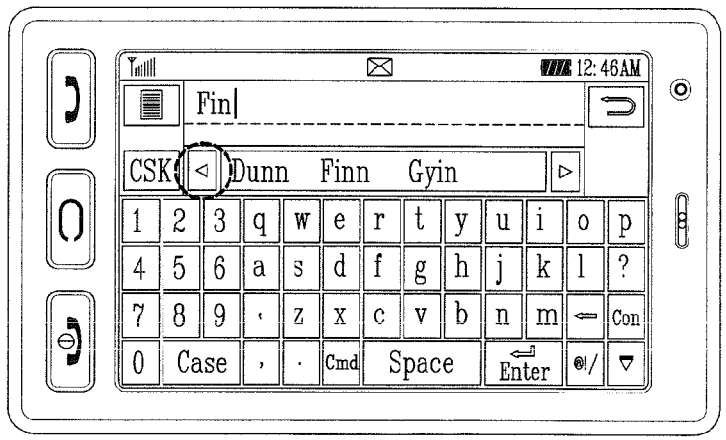

FIGS. 4A and 4B are views illustrating a soft key (hereinafter, referred to as a shape writer) displayed on the display unit according to an embodiment of the present invention.

As illustrated in FIG. 4A, a shape writer may include an indicator region 401, a title region 402, a main region 403, and a keypad region 404. The title region indicates a currently working module such as writing a SMS, an e-mail, a memo, and the like. The main region is displayed with a character or the like inputted through the keypad region. The title region and main region may be different according to a module associated with the shape writer. The keypad region may include a drawer pad region 410, a candidates region 411, a character and/or numeral key region 412, a command key 413, a case key 410, a symbol key 414, a keypad knob 415, a space 416, a back space key 417, and an input reservation key 418. FIG. 4B illustrates a shape writer in a horizontal direction.

As illustrated in FIG. 4A, the draw pad region may include functions (copy, paste, cut, delete, etc.) which are not frequently used but required of their accessibility. The user may drag or touch the drawer pad to display or hide functions included in the drawer pad.

The candidates region is displayed with a character string, a symbol, a command, and the like associated with the user's gesture. When candidates to be displayed are not all displayed in the region, then a left/right arrow button is highlighted at one side or both sides of the region.

The command key is a key for executing a command such as copy, paste, cut, delete, language selection, input method or other application execution, and the like, used in combination with other character keys.

The case key toggles English characters inputted in the order of Abc-abc-ABC by repeatedly inputting the key.

The keypad knob may hide or display the keypad region based on the input of the key.

A shape writer according to an embodiment of the present disclosure will be mainly described on the basis of a soft keyboard displayed on the display unit (touch screen) but may be implemented on a touch pad capable of receiving a gesture. The touch pad may be a hard-type keyboard displayed with a keypad of the shape writer.

FIG. 5 is a flow chart illustrating the process of outputting a character string associated with a gesture input from the user according to an embodiment of the present invention.

If the user drags a keypad region to input a gesture, then the controller detects it to store the inputted gesture in the memory (S110-S130). In addition to the shape of the gesture, each character associated with the gesture according to a keypad layout (for example, a character corresponding to a starting point of the gesture, a character corresponding to an end point of the gesture, a character corresponding to a directional change point during the gesture, and/or all characters that have been dragged and passed therethrough without directional change) may be stored therein.

The controller analyzes a shape or pattern of the gesture inputted from the user compares the analyzed pattern with a pattern of the character string stored in the memory (S140). During the comparison, only a shape of the gesture or a direction of each path constituting the gesture may be taken into consideration, or each character associated with the gesture according to the keypad layout may be taken into consideration in an associated manner.

As illustrated in FIG. 5C, the controller displays a character string of the pattern matched to the comparison result in the candidate region (S160). In case where there exist two or more character strings matched to the pattern, each character string may be arranged in a predetermined order according to the matching level, the used frequency, or the most recently used time, or the like. At the same time, furthermore, a character string arranged for the first time may be displayed in the main region.

The character string patterns stored in the memory, may include patterns for two or more languages such as Korean, English, French, German, and the like. As a result, without selecting any input language in particular, character strings with the same language or character string with different languages for the inputted gesture pattern may be displayed in the candidate word region.

If the user selects a different word (a word not being displayed in the main region), then the different word selected by the user will be displayed in the main region.

If a matched pattern is not found as a result of comparison, then the user can check spell/context for each character string having characters associated with the gesture according to the keypad layout using a dictionary stored in the memory (S210).

Next, it is determined whether or not the spell/context of a character string corresponding to the gesture is correct (S220).

As a result of the determination, if the character string corresponding to the gesture is correct (a word included in the dictionary), then it will be displayed in the main region (S230).

As a result of the determination, if the character string corresponding to the gesture is not correct (a word not included in the dictionary), then character strings similar to that will be displayed in the candidate word region by referring to the dictionary stored in the memory (S240).

A character string corresponding to the gesture may be displayed in the main region or candidate word region.

The user selects one of the candidate words being displayed in the candidate word region (S250). When the selected character string is a correct character string, i.e., a correct candidate word, the selected character string will be entered in the main region (S260). However, when a correct candidate word is not selected by the user, a character string corresponding to the gesture will be displayed, as it is, in the main region (S230).

Furthermore, if there is a predetermined input (command key+add, or character string registration displayed in the candidate word region), then a character string corresponding to the gesture and/or the pattern of a character string will be added to the pattern data or dictionary stored in the memory (S270).

If the user drags a keypad region again, the process will be repeated.

Figure 6A:
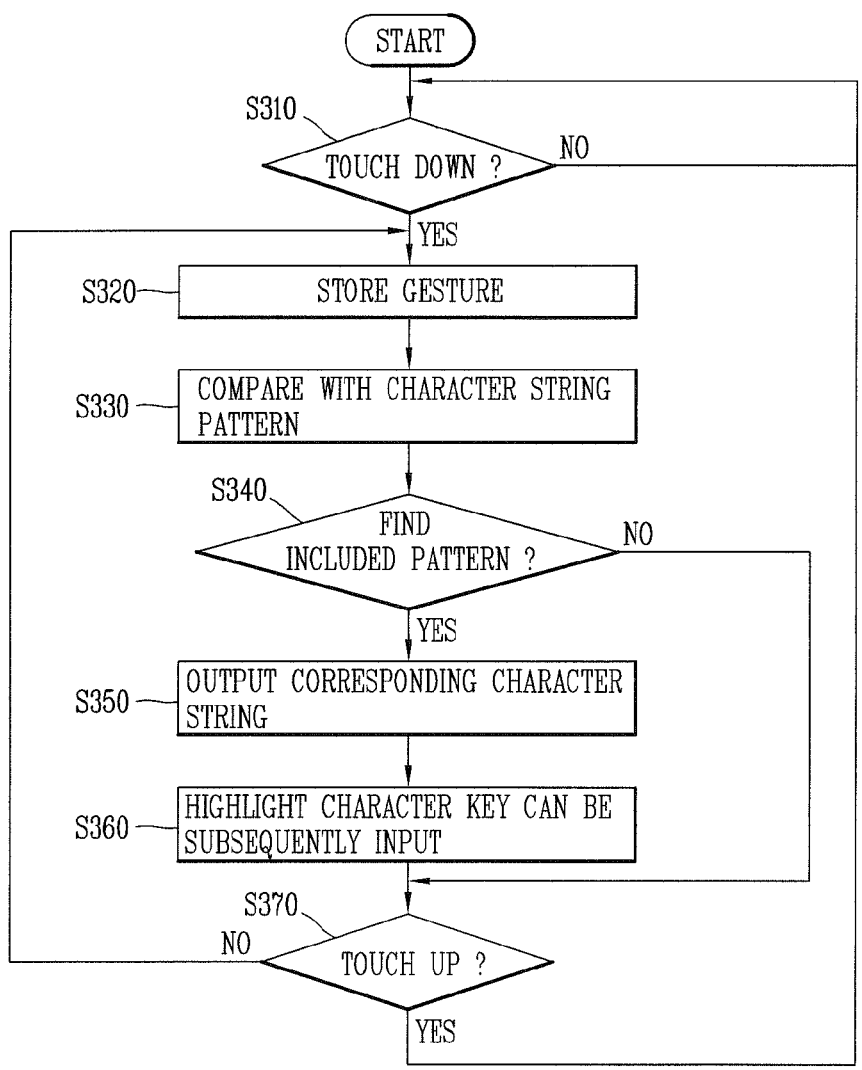
FIGS. 6A and 6B are flow charts illustrating the process of outputting a character string related to a gesture being inputted during the user's gesture input according to an embodiment of the present invention.
Figure 6B:
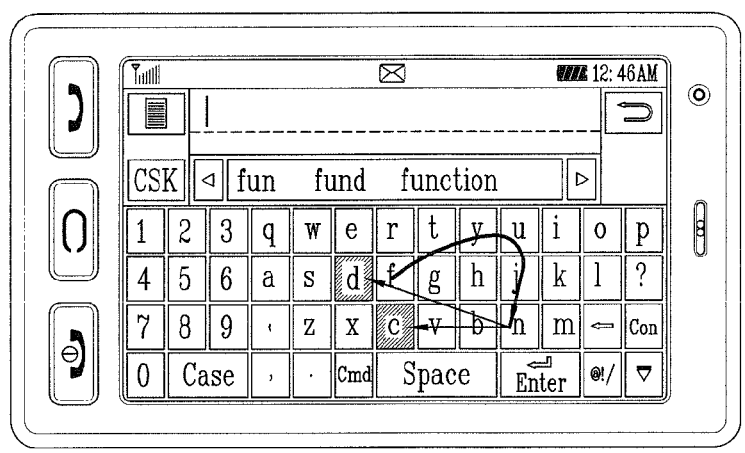

FIGS. 6A and 6B are flow charts illustrating the process of outputting a character string related to a gesture being inputted during the user's gesture input according to an embodiment of the present invention.

If the user drags a keypad region to start a gesture input (touch down and drag) (S310), then the controller continuously stores the gesture being inputted in the memory (S320). In addition to the shape of the gesture, each character associated with the gesture according to a keypad layout (for example, a character corresponding to a starting point of the gesture, a character corresponding to a directional change point during the gesture, and/or all characters that have been dragged and passed therethrough without directional change) may be stored therein.

Simultaneously with the gesture input, the controller compares a shape of the gesture being inputted from the user with a pattern of the character strings stored the memory (S330). During the comparison, only a shape of the gesture may be taken into consideration, or each character associated with the gesture according to the keypad layout may be taken into consideration in an associated manner.

In the pattern comparison process during the gesture input, contrary to the pattern comparison process in FIG. 5, an end point of the gesture is not included, and thus the controller finds a pattern including the pattern of the gesture being inputted (including a starting point pattern) among the patterns stored in the memory (S340).

Furthermore, only when a starting point that forms the pattern and a predetermined number of directional changes (for example, more than two directional changes) are inputted, it may be compared with a pattern of the character string stored in the memory. Alternatively, only when the user does not move for a predetermined period of time in the state of being touched down at a specific point during the gesture input, it may be compared with a pattern of the character string.

Alternatively, if a predetermined key (hereinafter, input reservation key) is input even when the user touches up at a specific point during the gesture input, it returns to the state of being touched down and dragged, thereby allowing the user to continuously input a gesture by connecting it with a pattern that has previously been input at the previous touch-up point. At the same time, it may be possible to find a pattern including the pattern of the gesture that has been input up to now using the same method as a state of the gesture being inputted.

As a result of the comparison, when a pattern including the pattern of the gesture being inputted is found, the controller displays a character string of the pattern including the pattern of the gesture that has been input up to now (S350). When there exist two or more patterns including the pattern, each character string may be arranged in a predetermined order according to the matching level, the used frequency, or the most recently used time, or the like. At the same time, furthermore, a character string of the first priority may be displayed in the main region.

At the same time, furthermore, character keys that can be subsequently input may be highlighted and displayed among the character keys of the keypad region (S360). For example, as illustrated in FIG. 6B, when the user inputs a pattern corresponding to "fun" through the gesture input but does not touch up, through the pattern comparison, "fun" (for example, it may not be displayed when completely matched), "fund", "function", and the like may be displayed in the candidate word region, and at the same time, character keys "d" and "c" may be highlighted and displayed in the keypad region. For the highlight display method, a corresponding key may be displayed in a bright manner or in a large size than the other keys, or the other keys may be displayed in a dim manner. Alternatively, arrows indicating a pattern to be subsequently inputted from the point currently being touched may be displayed.

When other keys are processed in a dim manner, a gesture of the pattern corresponding to character keys other than highlighted keys may not be inputted.

The user may subsequently input a gesture passing through "d" or "c" in the foregoing example, and according to a gesture being continuously inputted, candidate words displayed in the main region are changed, or the number of candidate words displayed in the candidate word region is reduced. If the user suspends an input of the gesture in the state that a specific candidate word is displayed in the main region, in other words, in case of touch-up (S370), a word being displayed in the main region will be definitely input.

When the user inputs a pattern corresponding to "fun" through the gesture input and touches up (S370), through the pattern comparison, both a matched pattern (same as described in FIGS. 5A and 5B) and including patterns (for example, "fun", "fund", "function", etc.) may be displayed in the candidate word region. Alternatively, only the matched pattern ("fun") may be first displayed, and including patterns ("fund", "function", etc.) may be displayed when a predetermined key (for example, input reservation key) is input from the user.

If the user selects candidate words displayed in the candidate word region, then the selected words will be displayed in the main region.

Hereinafter, when a gesture is input from the user, the process will be repeated.

FIG. 7 is a view illustrating the process of modifying, selecting, or re-inputting a word to be inputted in a state that a gesture input is completed (touched up) by the user as illustrated in FIG. 5 or 6.

If the user drags a keypad to input a gesture and touches up, then as described above, candidate words will be displayed in the main region and the candidate word region.

Figure 7A:
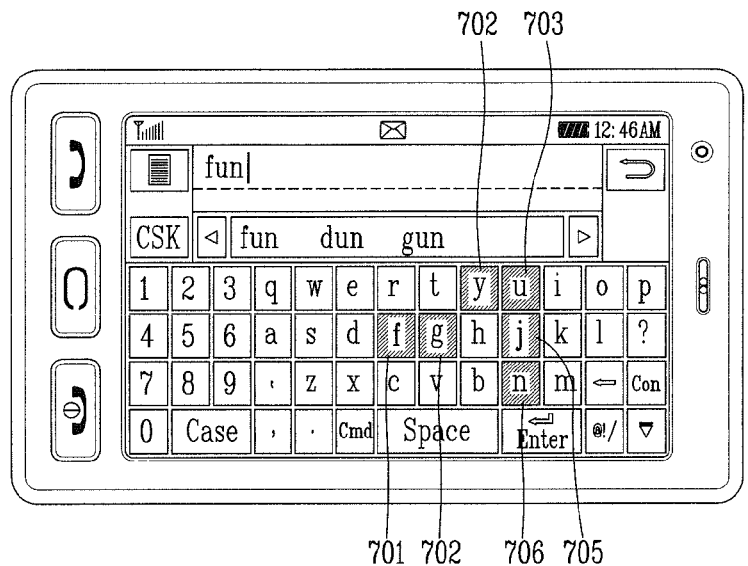
FIGS. 7A through 7E are views illustrating the process of modifying, selecting, or re-inputting a word to be inputted in a state that a gesture input is completed (touched up) by the user according to an embodiment of the present invention.

At the same time, as illustrated in FIG. 7A, character keys corresponding to the input gesture may be highlighted and displayed. For example, a character key 701 corresponding to a starting point, a character 704 corresponding to a directional change, a character key 706 corresponding to an end point, and/or all character keys 702, 703, 705 that have been dragged and passed therethrough without directional change may be highlighted and displayed in a bright manner, in a large size, or with another color, compared to the other keys.

Figure 7B:
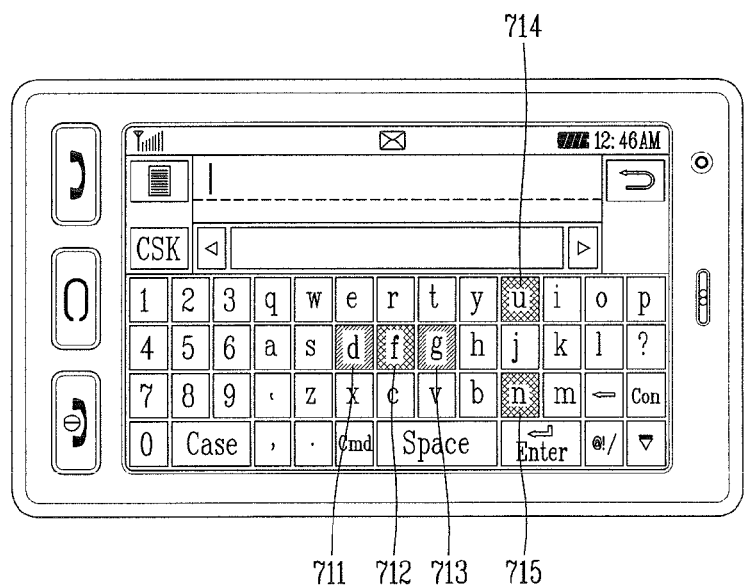
Figure 7C:
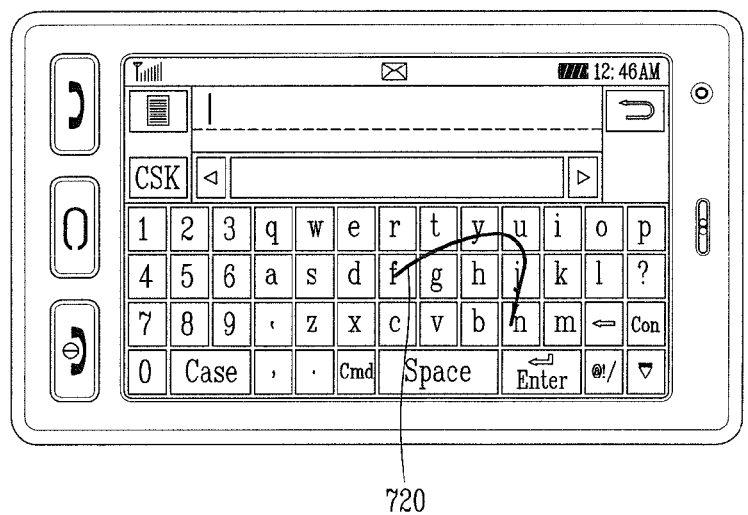
Figure 7D:
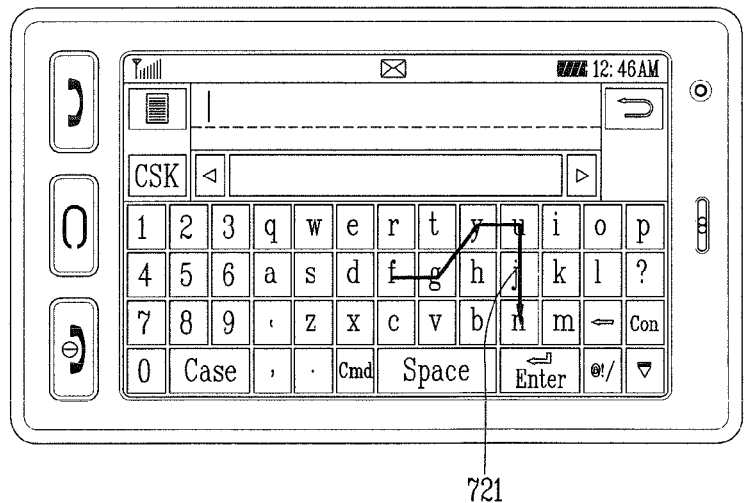
Figure 7E:
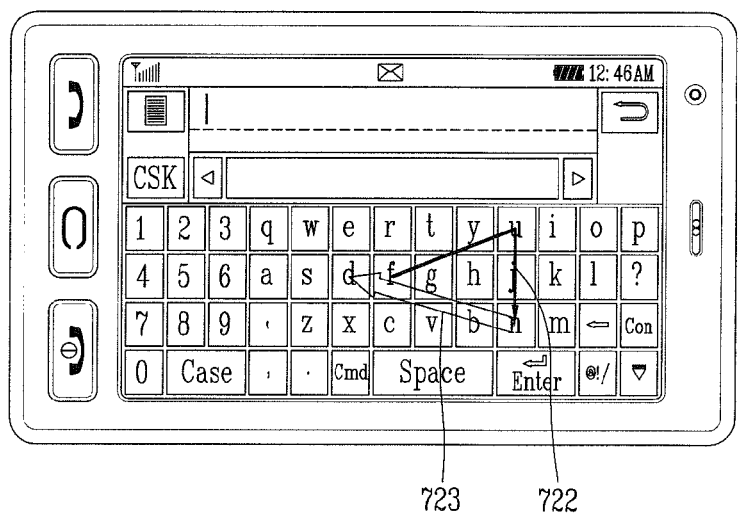

Furthermore, referring to FIG. 7B, only character keys 712, 714, 715 displayed in the main region may be highlighted and displayed among the character keys. Furthermore, all the character keys 711, 712, 713, 714, 715 included in the candidate words may be highlighted and displayed compared to the other character keys, and at the same time, the character keys 712, 714, 715 displayed in the main region or the character keys included in the words selected from the candidate word region may be displayed differently from the highlighted other character keys (for example, in a larger size, in a brighter manner, and with a different color, than the highlighted character keys).

Furthermore, a shape of the gesture dragged by the user to be input may be displayed. For example, a connecting line (reference numeral 721 in FIG. 7D), in which all the character keys that have been dragged and passed therethrough by the user are sequentially connected, is displayed on the key pad, or a connecting line (reference numeral 720 in FIG. 7C) indicating a shape itself of the gesture that has been dragged and inputted by the user may be displayed on the key pad. In addition, a connecting line (reference numeral 722 in FIG. 7E) indicating a pattern of the word currently being displayed in the main region may be displayed on the key pad together with the connecting line or without displaying the connecting line.

If a predetermined key (for example, input reservation key) is inputted in a state that specific character keys are highlighted and displayed and/or in a state that a connecting line is displayed as described above, then patterns and characters corresponding to the input gesture can be modified, deleted, and added. Alternatively, when there is no pattern matched to the input gesture, it may be modified, deleted, and added without inputting a predetermined key.

For example, if the user once clicks a specific highlighted and displayed character key (touches down and up), then only candidate words including (or not including) the selected character may be displayed in the main region and/or candidate word region, and if the user double-clicks a specific highlighted and displayed character key, then only candidate words sequentially including the selected character more than twice may be displayed in the main region and/or candidate word region.

Furthermore, for example, when characters included in a word displayed in the main region and other characters included in the candidate word are highlighted and displayed in a different manner (refer to FIG. 7B), if the user clicks character keys 711, 713 displayed only in the candidate word, then only candidate words including the selected character may be displayed in the main region and/or candidate word region.

Furthermore, for example, if the user clicks a character key (for example, "d") that is not highlighted and displayed, then candidate words ("fund") further including the selected character at any position of the candidate word are displayed again in the main region and/or candidate word region. If the character key is double-clicked, then candidate words sequentially including the selected character more than twice may be displayed at any position of the candidate word.

Furthermore, for example, if the user drags a character key (for example, "s") that is not highlighted and displayed to a character key (for example, "f") that is highlighted and displayed (or on the contrary, the user drags a character key that is highlighted and displayed to a character key that is not highlighted and displayed), a character corresponding to the highlighted character key is replaced with a character corresponding to the non-highlighted character key in the patterns or candidate words corresponding to a previously input gesture. Then, the replaced pattern may be compared with a pattern of the character string stored in the memory to display a character string (for example, "sun") of the matched pattern in the main region and/or candidate word region.

Furthermore, for example, if the user drags a character key that is not highlighted and displayed with a connecting line 711, 712, 713 between the character keys (or drags it to a specific character key by clicking a specific connecting line), then the selected character may be inserted between the characters connected with the connecting line, i.e., at a specific location. The character string of a pattern matched to the pattern in which a new character is inserted is newly displayed in the main region and/or candidate word region.

Furthermore, for example, if the user inputs a gesture by dragging from a character key (or any character key on the gesture) corresponding to an end point of the gesture (reference numeral 723 in FIG. 7E), then a previously inputted gesture (or a gesture inputted prior to any selected character key) is combined with a newly input gesture to form a pattern, and the character string ("fund") of a pattern matched to the newly formed pattern may be displayed in the main region and/or candidate word region.

Figure 8:
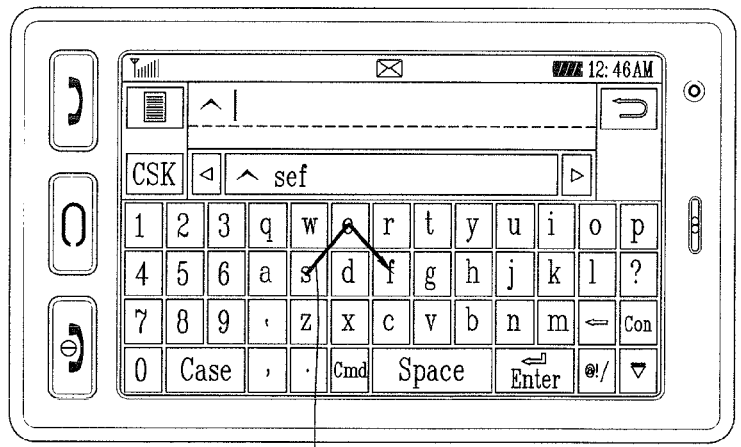
FIG. 8 is a view illustrating the process of inputting a symbol or the like through the user's handwriting recognition according to an embodiment of the present invention.

FIG. 8 is a view illustrating the process of inputting a symbol or the like through the user's handwriting recognition according to an embodiment of the present invention.

The pattern data stored in the memory may include a pattern for a handwriting that the user drags a touch pad to input, and a character, a symbol, or the like corresponding to that.

The user may select a handwriting input among the input methods in the command or select an additional input method selection key to select a handwriting input among them, Alternatively, without additionally changing the input method, the user may input a gesture in the shape writer mode as illustrated in FIGS. 5 through 7.

If the user drags a key pad region to input a handwriting gesture 801, then the controller compares a pattern of the gesture with a pattern stored in the memory.

When there is no specific input method such as handwriting input selection, as illustrated in FIG. 5, the pattern of the input gesture is compared with a pattern of the character string stored in the memory. Furthermore, at the same time, the controller also compares the pattern of the input gesture with a pattern of the handwriting stored in the memory.

The controller displays a character string ("sef") and/or symbol ("^") of the matched pattern (including all characters, symbols, and the like that can be inputted with a handwriting) in the main region and/or candidate word region.

For example, in case of a symbol, character or the like, such as "!", "?", "*", and the like, that cannot be input with a one-time gesture, more than two gestures may be combined to be recognized as one gesture to search the matched pattern. For example, if the user inputs a predetermined key (for example, input reservation key) and then inputs a second gesture subsequent to inputting a first gesture, then the controller recognizes the first and the second gesture as one gesture to search the matched pattern. Alternatively, when an input interval between the first gesture and the second gesture is less than a predetermined time period or there is no pattern matched to the first gesture, the controller may search both a pattern for each gesture and a pattern for the combined gesture to display a character string and/or symbol matched therewith in the main region and/or candidate word region.

FIGS. 9A through 9F are views illustrating the process of inputting a command according to an embodiment of the present invention.

The commands related to the command key in the shape writer mode may include editing functions such as block cursor, copy, cut, paste, delete, move, and the like, input method selection (shape writer mode, handwriting recognition mode, general keypad mode), input language selection (English, German, French, Korean, etc.), linking with other applications (e-book readers, writing messages and viewing transmitted/received messages, phone books, etc.), user defined commands, and the like.

Figure 9A:
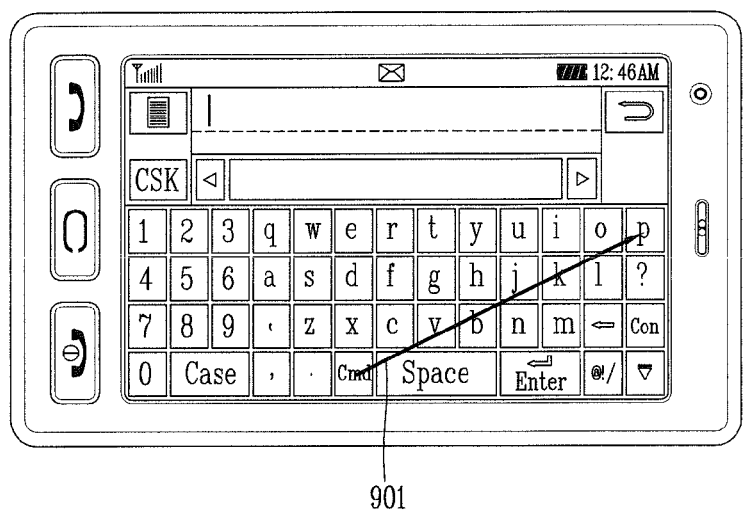
FIGS. 9A through 9F are views illustrating the process of inputting a command according to an embodiment of the present invention.

As illustrated in FIG. 9A, each command may be input by a gesture connected to a character (for example, alphabet) key corresponding to the command key. For example, if the user touches down the command key and drags it to the "p" character key to touch up (901), then a paste command corresponding to "p" will be executed. For example, if more than two commands correspond to one character key in such a case that the "c" character key correspond to copy and cut commands, then it may be executed by inputting a gesture including the next character key such as "u" or "o". Alternatively, if both the command key and the "c" character key are input, then copy and cut are displayed in the candidate word region, and it may be executed if the user selects either one of the both.

Figure 9B:
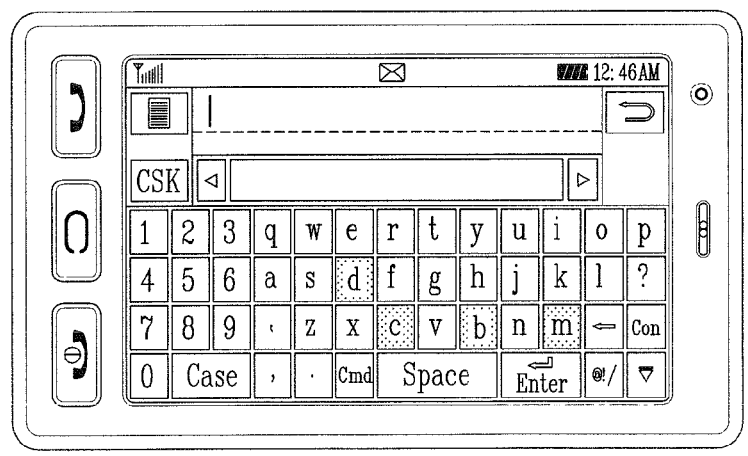

Furthermore, as illustrated in FIG. 9B, if the user touches down the command key, then character keys corresponding to the first character of all commands may be highlighted and displayed. For example, character keys such as "c", "b", "m", "d" and the like may be displayed in a larger size or in a brighter manner compared to other character keys, and the other keys may not be input. Alternatively, in the above case, if the "c" key is selected, then only "u" and "o" keys are highlighted and displayed again, and the other keys may not be input.

Figure 9C:
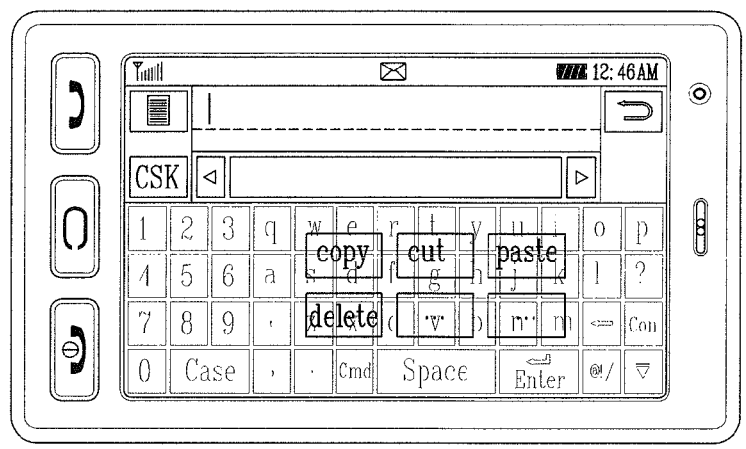

Alternatively, as illustrated in FIG. 9C, if the user touches the command key, for example, if selectable commands that can be input are all displayed in the keypad region and then the user touches and selects one of the displayed commands, then the selected command may be executed.

Figure 9D:
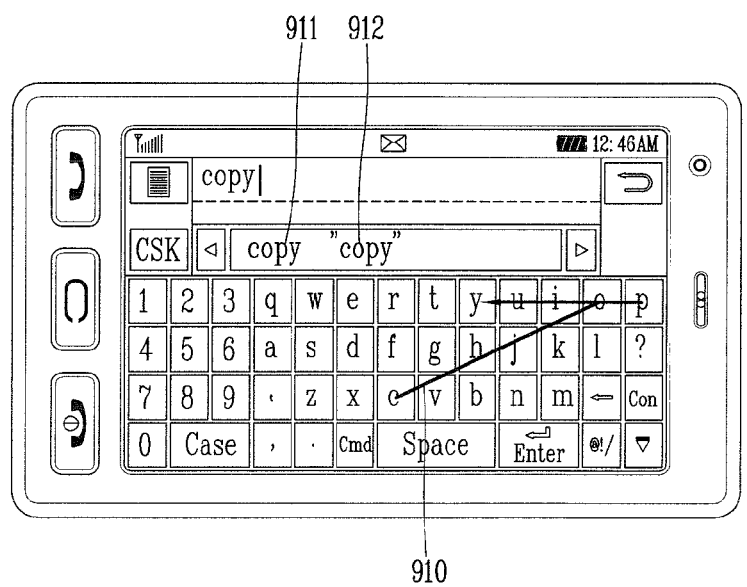

Alternatively, as illustrated in FIG. 9D, in the method that has been described in FIG. 5, the user may directly input a gesture of the character string corresponding to a command on the keypad to execute the command. For example, if the user inputs a gesture corresponding to a "copy" character string in a shape writer mode, then "copy" 911 will be displayed in the candidate word region and/or the main region. At this time, "copy" 912 (displayed differently from other candidate words to identify that it is a command) is displayed in the candidate word region or in a separate region, and copy is executed when the user selects this command.

Figure 9E:
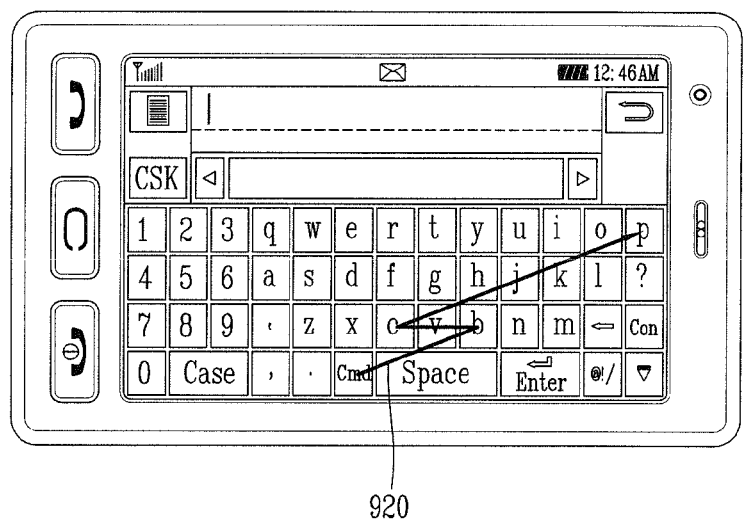

Furthermore, as illustrated in FIG. 9E, one or more commands are sequentially selected to be executed. For example, if the user wants to sequentially input a block cursor→cut→paste commands, then one gesture 920 passing through the commands+"b"+"cu"+"p" will be input. Then, if the user selects a specific point in the main region, then the block will be removed, and then if the user selects another point, then the removed block will be inserted in the point.

Figure 9F:
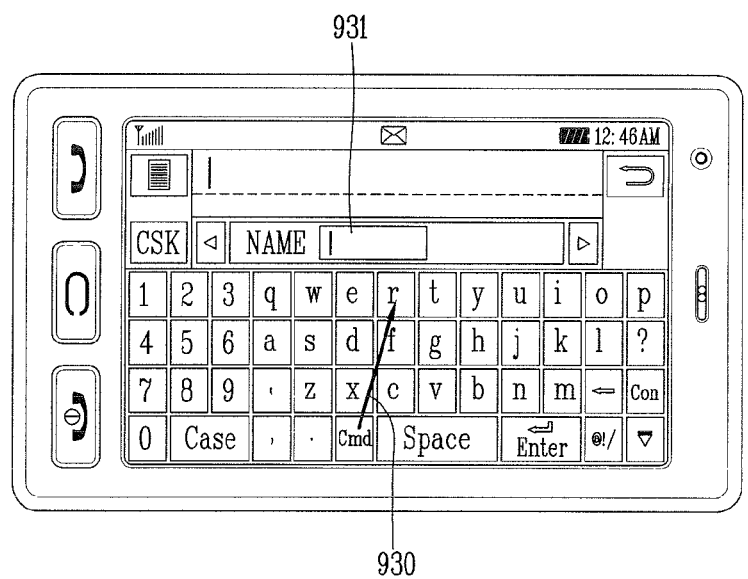

Furthermore, as illustrated in FIG. 9F, a user-defined command (user-customized command) may be registered. For example, if the user inputs the command key+"r" (register), then an input window 931 for allowing the user to register the name of a command may be displayed. Then, the user inputs the name of a command to be registered in the displayed input window. If the name of a command is input, then the user inputs a new command to be registered as the input name. The new command may be a combination of existing commands 920. Then, if the user inputs a command that has been registered in the foregoing method, then the user's defined new command will be executed.

Furthermore, according to an embodiment of the present invention, the foregoing method may be implemented as codes readable by a processor on a medium written by the program. Examples of the computer-readable media may include ROM, RAM, CD-ROM, magnetic tape, floppy disk, and optical data storage device, and the like, and also include a device implemented in the form of a carrier wave (for example, transmission via the Internet).

According to a mobile terminal with a method for inputting a string of characters and an apparatus thereof applied thereto as described above, the configurations and methods according to the above-described embodiments will not be applicable in a limited way, and all or part of each embodiment may be selectively combined and configured to make various modifications thereto.

As described above, preferred embodiments of the present invention have been described with reference to the accompanying drawings.

Here, the terms and words used herein and the claims should not be construed by limiting to their typical or lexical meaning, but should be construed based on the meaning and concept conforming to the technical spirit of the present invention. Accordingly, the configuration illustrated in the embodiments disclosed herein and the drawings is merely the most preferred embodiment of the present invention, and is not intended to represent all the technical spirit of the present invention, and thereby it should be appreciated that there may exist various equivalents and modifications for substituting those at the time of filing this application.

What is claimed is:

1. A method for inputting a character string in a terminal, the method comprising:
    receiving a gesture input generated by a touch and drag motion on a keypad;
    identifying a character string corresponding to the gesture input by comparing a shape of the gesture input with a plurality of shapes of gestures associated with a plurality of corresponding character strings and based on each character on the keypad touched by the gesture input, wherein the plurality of shapes of gestures and the plurality of character strings are stored in a memory;
    displaying the character string on a display unit;
    displaying a connecting line corresponding to a shape of the gesture input and including said each character on the keypad;
    modifying the gesture input into a modified gesture input in response to dragging of a key on the keypad which is not on the connecting line to the connecting line; and
    displaying another character string corresponding to the modified gesture input,
    wherein a character corresponding to the key is inserted between two characters corresponding to two keys on the connecting line to generate said another character string when the key is dragged between the two keys on the keypad.

2. The method of claim 1, further comprising:
    storing the gesture input in the memory.

3. The method of claim 1, wherein said displaying step displays the character string in a candidate word region or a main region distinguished from the candidate word region.

4. The method of claim 1, further comprising:
    highlighting and displaying a key on the keypad corresponding to a character of which a further input is expected.

5. The method of claim 4, wherein said highlighting and displaying step displays the key on the keypad corresponding to the character of which the further input is expected largely or brightly to distinguish the key from other keys, and then displays a drag direction of which the further input is expected.

6. The method of claim 1, wherein the character string is displayed when the gesture input begins.

7. An apparatus for inputting a character string, the apparatus comprising:
    a keypad;
    a memory;
    a display unit; and
    a controller coupled to the keypad, the memory, and the display unit, the controller configured to:
    receive a gesture input generated by a touch and drag motion on the keypad;
    identify a character string corresponding to the gesture input by comparing a shape of the gesture input with a plurality of shapes of gestures associated with a plurality of corresponding character strings and based on each character on the keypad touched by the gesture input, wherein the plurality of shapes of gestures and the plurality of character strings are stored in the memory;
    display the character string on the display unit;
    display a connecting line corresponding to a shape of the gesture input and including said each character on the keypad;
    modify the gesture input into a modified gesture input in response to dragging of a key on the keypad which is not on the connecting line to the connecting line; and
    display another character string corresponding to the modified gesture input, wherein a character corresponding to the key is inserted between two characters corresponding to two keys on the connecting line to generate said another character string when the key is dragged between the two keys on the keypad.

8. The apparatus of claim 7, wherein the controller controls the display unit to display the character string in a candidate word region or a main region distinguished from the candidate word region.

9. The apparatus of claim 7, wherein the keypad is a software keypad displayed on the display unit with a touch screen type.

10. The apparatus of claim 7, wherein the keypad is a hardware keypad for detecting the gesture input, and each key on the keypad is highlighted and displayed according to a control of the controller.

11. The apparatus of claim 7, wherein the plurality of character strings stored in the memory are in more than two languages.

12. The apparatus of claim 7, wherein the controller controls the display unit to highlight and display a key on the keypad corresponding to a character of which a further input is expected.

13. The apparatus of claim 7, wherein the memory further stores commands, and the controller controls the display unit to highlight and display a key on the keypad corresponding to a character indicating a command stored in the memory when a gesture input starting from a command key on the keypad is entered.

14. A method for inputting a character string in a terminal, the method comprising:
   receiving a gesture input generated by a touch and drag motion on a keypad;
   identifying a character string corresponding to the gesture input by comparing a shape of the gesture input with a plurality of shapes of gestures associated with a plurality of corresponding character strings based on each character on the keypad touched by the gesture input, wherein the plurality of shapes of gestures and the plurality of character strings are stored in a memory;
   displaying the character string on a display unit;
   highlighting each key on the keypad corresponding to each character of the character string;
   displaying a connecting line corresponding to a shape of the gesture input and including said each character on the keypad;
   modifying the gesture input into a modified gesture input in response to dragging of a key on the keypad which is not on the connecting line to the connecting line; and
   displaying another character string corresponding to the modified gesture input, wherein a character corresponding to the key is inserted between two characters corresponding to two keys on the connecting line to generate said another character string when the key is dragged between the two keys on the keypad.

15. An apparatus for inputting a character string, the apparatus comprising:
   a keypad;
   a memory;
   a display unit; and
   a controller coupled to the keypad, the memory, and the display unit, and the controller configured to:
   receive a gesture input generated by a touch and drag motion on the keypad;
   identify a character string corresponding to the gesture input by comparing a shape of the gesture input with a plurality of shapes of gestures associated with a plurality of corresponding character strings and based on each character on the keypad touched by the gesture input, wherein the plurality of shapes of gestures and the plurality of character strings are stored in the memory;
   display the character string on the display unit;
   highlight each key on the keypad corresponding to each character of the character string;
   display a connecting line corresponding to a shape of the gesture input and including said each character on the keypad;
   modify the gesture input into a modified gesture input in response to dragging of a key on the keypad which is not on the connecting line to the connecting line; and
   display another character string corresponding to the modified gesture input, wherein a character corresponding to the key is inserted between two characters corresponding to two keys on the connecting line to generate said another character string when the key is dragged between the two keys on the key pad.

* * * * *